United States Patent
Nesbit et al.

(10) Patent No.: US 12,001,380 B2
(45) Date of Patent: *Jun. 4, 2024

(54) SINGLE-SIDED DISTRIBUTED STORAGE SYSTEM

(71) Applicant: Google LLC, Mountain View, CA (US)

(72) Inventors: Kyle Nesbit, Madison, WI (US); Andrew Everett Phelps, Middleton, WI (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,164

(22) Filed: Apr. 10, 2023

(65) Prior Publication Data

US 2023/0244631 A1 Aug. 3, 2023

Related U.S. Application Data

(63) Continuation of application No. 17/658,764, filed on Apr. 11, 2022, now Pat. No. 11,645,223, which is a
(Continued)

(51) Int. Cl.
*G06F 15/173* (2006.01)
*G06F 3/06* (2006.01)

(52) U.S. Cl.
CPC ...... *G06F 15/17331* (2013.01); *G06F 3/0611* (2013.01); *G06F 3/0619* (2013.01);
(Continued)

(58) Field of Classification Search
CPC ............. G06F 15/17331; G06F 3/0611; G06F 3/0619; G06F 3/0643; G06F 3/065; G06F 3/0659; G06F 3/067
See application file for complete search history.

(56) References Cited

U.S. PATENT DOCUMENTS 5,857,190 A 1/1999 Brown
6,026,414 A 2/2000 Anglin
(Continued)

FOREIGN PATENT DOCUMENTS

CN 100380334 C 4/2008
EP 1498822 A2 1/2005
(Continued)

OTHER PUBLICATIONS

Ghemawat, Sanjay, Howard Gobioff, and Shun-Tak Leung. "The Google file system." ACM SIGOPS operating systems review. vol. 37. No. 5. ACM, 2003. (Year: 2003).*

*Primary Examiner* — Charles Rones
*Assistant Examiner* — Hewy H Li
(74) *Attorney, Agent, or Firm* — Honigman LLP; Brett A. Krueger

(57) ABSTRACT

A distributed storage system including memory hosts and at least one curator in communication with the memory hosts. Each memory host has memory, and the curator manages striping of data across the memory hosts. In response to a memory access request by a client in communication with the memory hosts and the curator, the curator provides the client a file descriptor mapping data stripes and data stripe replications of a file on the memory hosts for remote direct memory access of the file on the memory hosts.

20 Claims, 8 Drawing Sheets

Related U.S. Application Data continuation of application No. 17/037,286, filed on Sep. 29, 2020, now Pat. No. 11,321,273, which is a continuation of application No. 16/508,578, filed on Jul. 11, 2019, now Pat. No. 10,810,154, which is a continuation of application No. 15/885,918, filed on Feb. 1, 2018, now Pat. No. 10,387,364, which is a continuation of application No. 14/987,443, filed on Jan. 4, 2016, now Pat. No. 9,916,279, which is a continuation of application No. 13/492,346, filed on Jun. 8, 2012, now Pat. No. 9,229,901.

(52) U.S. Cl.
CPC ............ *G06F 3/0643* (2013.01); *G06F 3/065* (2013.01); *G06F 3/0659* (2013.01); *G06F 3/067* (2013.01)

(56) References Cited

U.S. PATENT DOCUMENTS

| | | |
|---|---|---|
| 6,219,693 B1 | 4/2001 | Napolitano et al. |
| 6,260,069 B1 | 7/2001 | Anglin |
| 6,301,605 B1 | 10/2001 | Napolitano et al. |
| 6,721,806 B2 | 4/2004 | Boyd et al. |
| 7,418,487 B2 | 8/2008 | Andreas |
| 7,475,207 B2 | 1/2009 | Bromling et al. |
| 7,487,153 B2 | 2/2009 | Makhervaks et al. |
| 7,554,976 B2 | 6/2009 | Feng et al. |
| 7,565,454 B2 | 7/2009 | Zuberi |
| 7,725,535 B2 | 5/2010 | Koonce et al. |
| 7,761,619 B2 | 7/2010 | Feng et al. |
| 7,827,350 B1 | 11/2010 | Jiang et al. |
| 7,934,055 B2 | 4/2011 | Flynn et al. |
| 8,006,065 B2 | 8/2011 | Bestler |
| 8,019,940 B2 | 9/2011 | Flynn et al. |
| 8,090,790 B2 | 1/2012 | Bestler |
| 8,095,730 B1 | 1/2012 | Jiang et al. |
| 8,122,155 B1 | 2/2012 | Marti |
| 8,224,777 B2 | 7/2012 | Kimmel |
| 8,325,633 B2 | 12/2012 | Archer et al. |
| 8,458,418 B1 | 6/2013 | Singh et al. |
| 8,468,521 B2 | 6/2013 | Pawlowski |
| 2003/0149750 A1 | 8/2003 | Franzenburg |
| 2004/0049774 A1 | 3/2004 | Boyd et al. |
| 2004/0073622 A1 | 4/2004 | McDaniel et al. |
| 2004/0111498 A1 | 6/2004 | Andreas |
| 2005/0015469 A1 | 1/2005 | Zuberi |
| 2005/0129045 A1 | 6/2005 | Machulsky et al. |
| 2005/0198062 A1 | 9/2005 | Shapiro |
| 2005/0213608 A1 | 9/2005 | Modi et al. |
| 2006/0165084 A1 | 7/2006 | Makhervaks et al. |
| 2006/0168091 A1 | 7/2006 | Makhervaks et al. |
| 2006/0256784 A1 | 11/2006 | Feng et al. |
| 2006/0259570 A1 | 11/2006 | Feng et al. |
| 2008/0140932 A1 | 6/2008 | Flynn et al. |
| 2008/0235746 A1 | 9/2008 | Peters et al. |
| 2008/0256183 A1 | 10/2008 | Flynn et al. |
| 2008/0256292 A1 | 10/2008 | Flynn et al. |
| 2008/0313364 A1 | 12/2008 | Flynn et al. |
| 2009/0100163 A1 | 4/2009 | Tsao et al. |
| 2010/0017802 A1 | 1/2010 | Lojewski |
| 2010/0083247 A1 | 4/2010 | Kanevsky et al. |
| 2011/0066824 A1 | 3/2011 | Bestler |
| 2011/0093740 A1 | 4/2011 | Tsao et al. |
| 2011/0179225 A1 | 7/2011 | Flynn et al. |
| 2011/0296277 A1 | 12/2011 | Flynn et al. |
| 2012/0011176 A1 | 1/2012 | Aizman |
| 2012/0066407 A1 | 3/2012 | Andries et al. |
| 2012/0072607 A1 | 3/2012 | Kawashima et al. |
| 2012/0117610 A1 | 5/2012 | Pandya |
| 2013/0086269 A1 | 4/2013 | Bairavasundaram et al. |
| 2013/0086324 A1 | 4/2013 | Soundararajan et al. |
| 2014/0052706 A1 * | 2/2014 | Misra ................ G06F 16/1837 707/698 |

FOREIGN PATENT DOCUMENTS

| | | | |
|---|---|---|---|
| EP | 1543422 A1 | 6/2005 | |
| EP | 1552409 A1 | 7/2005 | |
| EP | 1839162 A1 | 10/2007 | |
| EP | 2126709 A2 * | 12/2009 | ............ G06F 1/183 |
| EP | 2126709 A2 | 12/2009 | |
| JP | 04012545 B2 | 1/1992 | |
| JP | 2011222011 A | 11/2011 | |
| KP | 2007072682 A | 7/2007 | |
| KP | 754308 B1 | 9/2007 | |
| KR | 2005009685 A | 1/2005 | |
| KR | 2005057185 A | 6/2005 | |
| WO | 2004017220 A1 | 2/2004 | |
| WO | 2004023305 A2 | 3/2004 | |
| WO | 2006076993 A1 | 7/2006 | |
| WO | 2006124718 A2 | 11/2006 | |
| WO | 2008070172 A2 | 6/2008 | |
| WO | 2012061255 A2 | 5/2012 | |

* cited by examiner

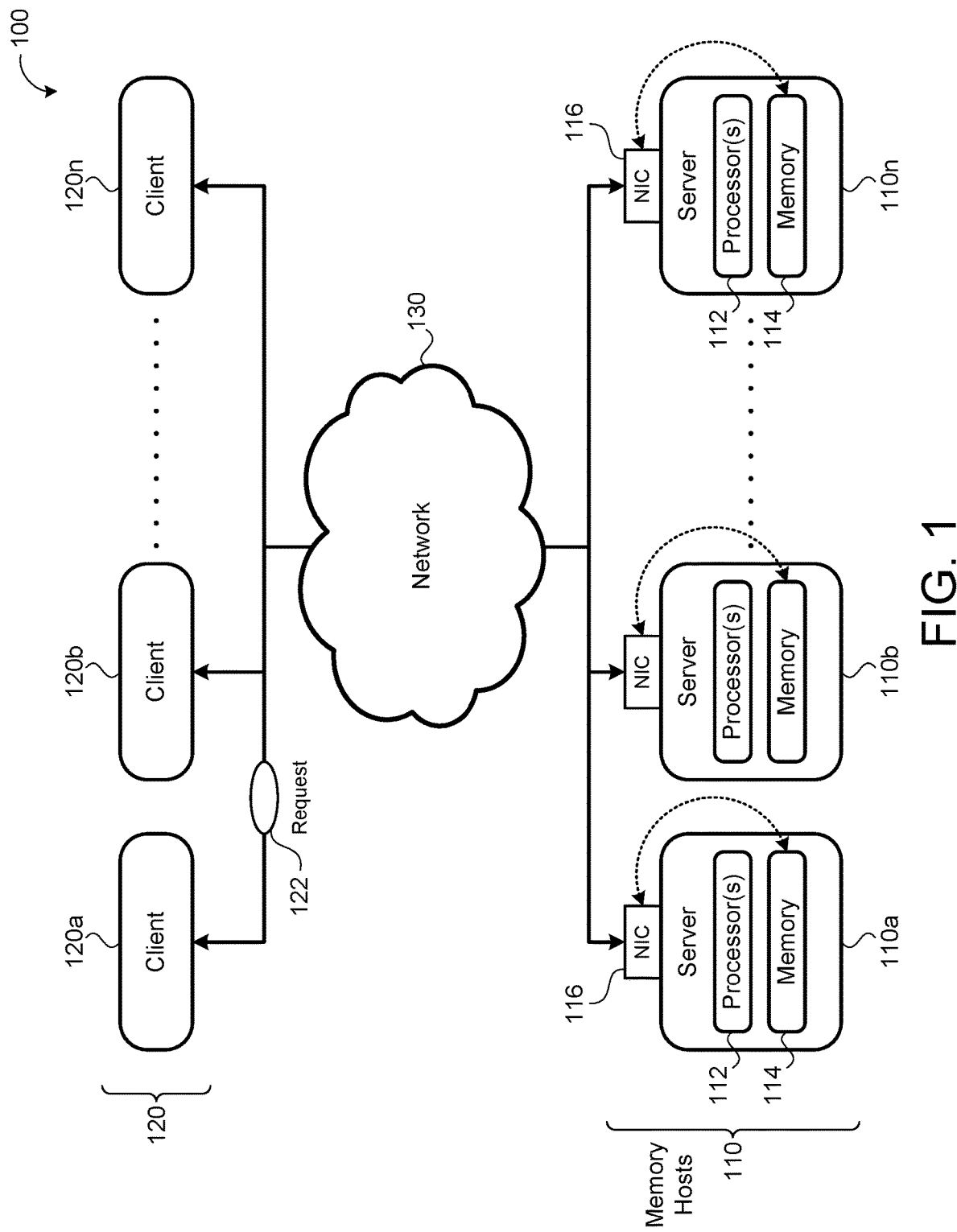

SINGLE-SIDED DISTRIBUTED STORAGE SYSTEM

CROSS REFERENCE TO RELATED APPLICATIONS

This U.S. patent application is a continuation of, and claims priority under 35 U.S.C. § 120 from U.S. patent application Ser. No. 17/658,764, filed on Apr. 11, 2022, which is a continuation of U.S. patent application Ser. No. 17/037,286, filed on Sep. 29, 2020, now U.S. Pat. No. 11,321,273, which is a continuation of U.S. patent application Ser. No. 16/508,578, filed on Jul. 11, 2019, now U.S. Pat. No. 10,810,154, which is a continuation of U.S. patent application Ser. No. 15/885,918, filed on Feb. 1, 2018, now U.S. Pat. No. 10,387,364, which is a continuation of U.S. patent application Ser. No. 14/987,443, filed on Jan. 4, 2016, now U.S. Pat. No. 9,916,279, which is a continuation of U.S. patent application Ser. No. 13/492,346, filed on Jun. 8, 2012, now U.S. Pat. No. 9,229,901. The disclosures of these prior applications are considered part of the disclosure of this application and are hereby incorporated by reference in their entireties.

TECHNICAL FIELD

This disclosure relates to distributed storage systems.

BACKGROUND

A distributed system generally includes many loosely coupled computers, each of which typically include a computing resource (e.g., processor(s)) and storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes.

A remote procedure call is a two-sided software operation initiated by client software executing on a first machine and serviced by server software executing on a second machine. Servicing storage system requests (e.g., read data) in software may require an available processor, which may place a significant limitation on a distributed storage system. In the case of a distributed storage system, this means a client process cannot access a remote computer's storage resources unless the remote computer has an available processor to service the client's request. Moreover, the demand for processor resources and storage resources in a distributed system often do not match. In particular, computing resource (i.e., processors) may have heavy and/or unpredictable usage patterns, while storage resources may have light and very predictable usage patterns. When a server's processor(s) are heavily utilized, there may be no processors available to service a storage request when it arrives. In this case, the storage request waits for completion of other software tasks executed by the processor(s) or preemption by a kernel before the storage request can be serviced by a processor, even though there may be plenty of storage bandwidth to service the request immediately. Alternatively, one or more dedicated processors could service such storage requests, at the expense of efficiency and decreased processing capacity for nominal processing tasks.

Generally, coupling processor and storage resources can result in high and/or unpredictable latency, especially if the distributed system's processor resources are heavily utilized.

SUMMARY

One aspect of the disclosure provides a distributed storage system that includes memory hosts and at least one curator in communication with the memory hosts. Each memory host has memory, and the curator manages striping of data across the memory hosts. In response to a memory access request by a client in communication with the memory hosts and the curator, the curator provides the client a file descriptor mapping data stripes and data stripe replications of a file on the memory hosts for remote direct memory access of the file on the memory hosts.

Implementations of the disclosure may include one or more of the following features. In some implementations, the distributed storage system includes a network, such as InfiniBand or Ethernet network, providing communication between the memory hosts and the client(s). Each memory host includes a network interface controller in communication with its memory (e.g., dynamic random access memory and/or phase change memory). The network interface controller services remote direct memory access requests.

The curator may return location information of data on the memory hosts in response to the client memory access request. In some examples, the curator returns a key to allow access to data on the memory hosts in response to the client memory access request. The curator may allocate storage of a data stripe on the memory hosts. Each file stored on the memory hosts may be divided into data stripes and each data stripe may be replicated into multiple storage locations of the memory hosts. In some implementations, the curator stores a file map mapping files to file descriptors.

The file descriptor may include at least one of the following: a file state attribute providing a state of a file, a data chunks attribute providing a number of stripe replicas per stripe, a stripe length attribute providing a number of bytes per stripe, and a sub-stripe length attribute providing a number of bytes per sub-stripe. In some examples, the file descriptor includes an array of stripe protocol buffers, each describing a data stripe replica within a data stripe. Each stripe protocol buffer may include at least one of a stripe replica handle, an identity of the memory host holding the stripe replica, and a current state of the stripe replica.

In some implementations, the distributed storage system includes cells. Each cell includes a curator and memory hosts in communication with the curator. A transaction, in response to a client memory access request, executes at least one of a read operation and a write operation on files stored in the memory hosts of that cell.

Another aspect of the disclosure provides a method of providing access to data stored on a distributed storage system. The method includes electronically receiving a memory access request from a client and returning a file descriptor mapping data stripes and data stripe replications of a file on memory hosts for remote direct memory access of the file on the memory hosts.

In some implementations, the method includes accessing a file map mapping files to file descriptors to return the file descriptor in response to the memory access request. The method may include returning location information of data on the memory hosts in response to the client memory access request. The method may include returning a key to allow access to data on the memory hosts in response to the client memory access request. In some examples, the method includes allocating storage of a data stripe on the memory hosts. The method may include dividing the file into data stripes and replicating each data stripe into multiple storage locations of the memory hosts.

In some implementations, the method includes providing at least one of a file state attribute providing a state of a file, a data chunks attribute providing a number of stripe replicas per stripe, a stripe length attribute providing a number of bytes per stripe, and a sub-stripe length attribute providing a number of bytes per sub-stripe in the file descriptor. The method may include providing in the file descriptor an array of stripe protocol buffers, each describing a data stripe replica within a data stripe.

Yet another aspect of the disclosure provides a computer program product encoded on a non-transitory computer readable storage medium including instructions that when executed by a data processing apparatus cause the data processing apparatus to perform operations. The operations include electronically receiving a memory access request from a client and returning a file descriptor mapping data stripes and data stripe replications of a file on memory hosts for remote direct memory access of the file on the memory hosts.

In some implementations, the operations include accessing a file map mapping files to file descriptors to return the file descriptor in response to the memory access request. The operations may include returning location information of data on the memory hosts in response to the client memory access request. The operations may include returning a key to allow access to data on the memory hosts in response to the client memory access request. In some examples, the operations include allocating storage of a data stripe on the memory hosts. The operations may include dividing the file into data stripes and replicating each data stripe into multiple storage locations of the memory hosts.

In some implementations, the operations include providing at least one of a file state attribute providing a state of a file, a data chunks attribute providing a number of stripe replicas per stripe, a stripe length attribute providing a number of bytes per stripe, and a sub-stripe length attribute providing a number of bytes per sub-stripe in the file descriptor. The operations may include providing in the file descriptor an array of stripe protocol buffers, each describing a data stripe replica within a data stripe.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic view of an exemplary distributed storage system.

Like reference symbols in the various drawings indicate like elements.

DETAILED DESCRIPTION

Figure 2A:
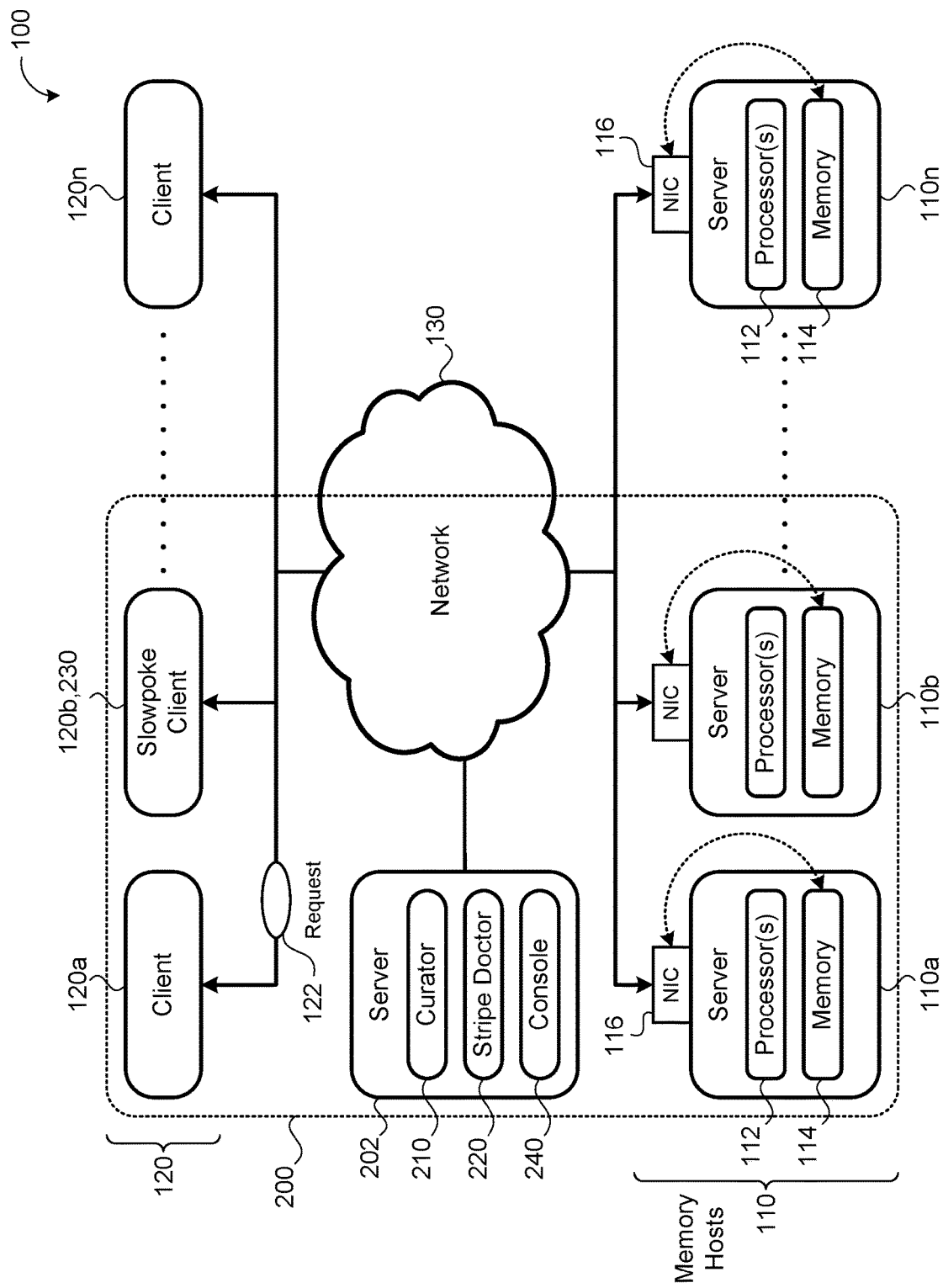
FIG. 2A is a schematic view of an exemplary distributed storage system having a cell of memory hosts managed by a curator.

Referring to FIGS. 1-3, in some implementations, a distributed storage system 100 includes loosely coupled memory hosts 110, 110*a-n* (e.g., computers or servers), each having a computing resource 112 (e.g., one or more processors) in communication with storage resources 114 (e.g., memory, flash memory, dynamic random access memory (DRAM), phase change memory (PCM), and/or disks). A storage abstraction (e.g., key/value store or file system) overlain on the storage resources 114 allows scalable use of the storage resources 114 by one or more clients 120, 120*a-n*. The clients 120 may communicate with the memory hosts 110 through a network 130. Rather than having a processor 112 of a memory host 110 (e.g., a server) execute a server process that exports access of the corresponding storage resource 114 (e.g., memory) to client processes executing on the clients 120, the clients 120 may directly access the storage resource 114 through a network interface controller (NIC) 116 of the memory host 110. In other words, a client process executing on a client 120 may directly interface with one or more storage resources 114 without requiring execution of a routine of any server processes executing on the computing resources 112. This offers a single-sided distributed storage architecture that offers relatively high-throughput and low latency, since clients 120 can access the storage resources 114 without interfacing with the computing resources 112 of the memory hosts 110.

A network interface controller 116 (also known as a network interface card, network adapter, or LAN adapter) may be a computer hardware component that connects a computing resource 112 to the network 130. The network controller 116 implements communication circuitry using a specific physical layer (OSI layer 1) and data link layer (layer 2) standard, such as Ethernet, Wi-Fi, or Token Ring. This provides a base for a full network protocol stack, allowing communication among small groups of computers on the same LAN and large-scale network communications through routable protocols, such as Internet Protocol (IP).

In some implementations, the network 130 is an InfiniBand network, which is a switched fabric communications link generally used in high-performance computing and enterprise data centers. It features high throughput, low latency, quality of service, failover, and scalability. The InfiniBand architecture specification defines a connection between processor nodes and high performance I/O nodes such as storage devices. The InfiniBand network 130 conveys remote direct memory access (RDMA) requests 122 from a client 120 to a memory host 110. At the memory host 110, an RDMA-capable InfiniBand network interface controller (NIC) 116 performs reads and writes of the storage resource 114 (e.g., DRAM). RDMA uses zero-copy, OS-bypass to provide high throughput, low latency access to data (e.g., 4 GB/s of bandwidth and 5 microsecond latency). The distributed storage system 100 may use RDMA, remote procedure calls, or other data access methods to access data.

Figure 2B:
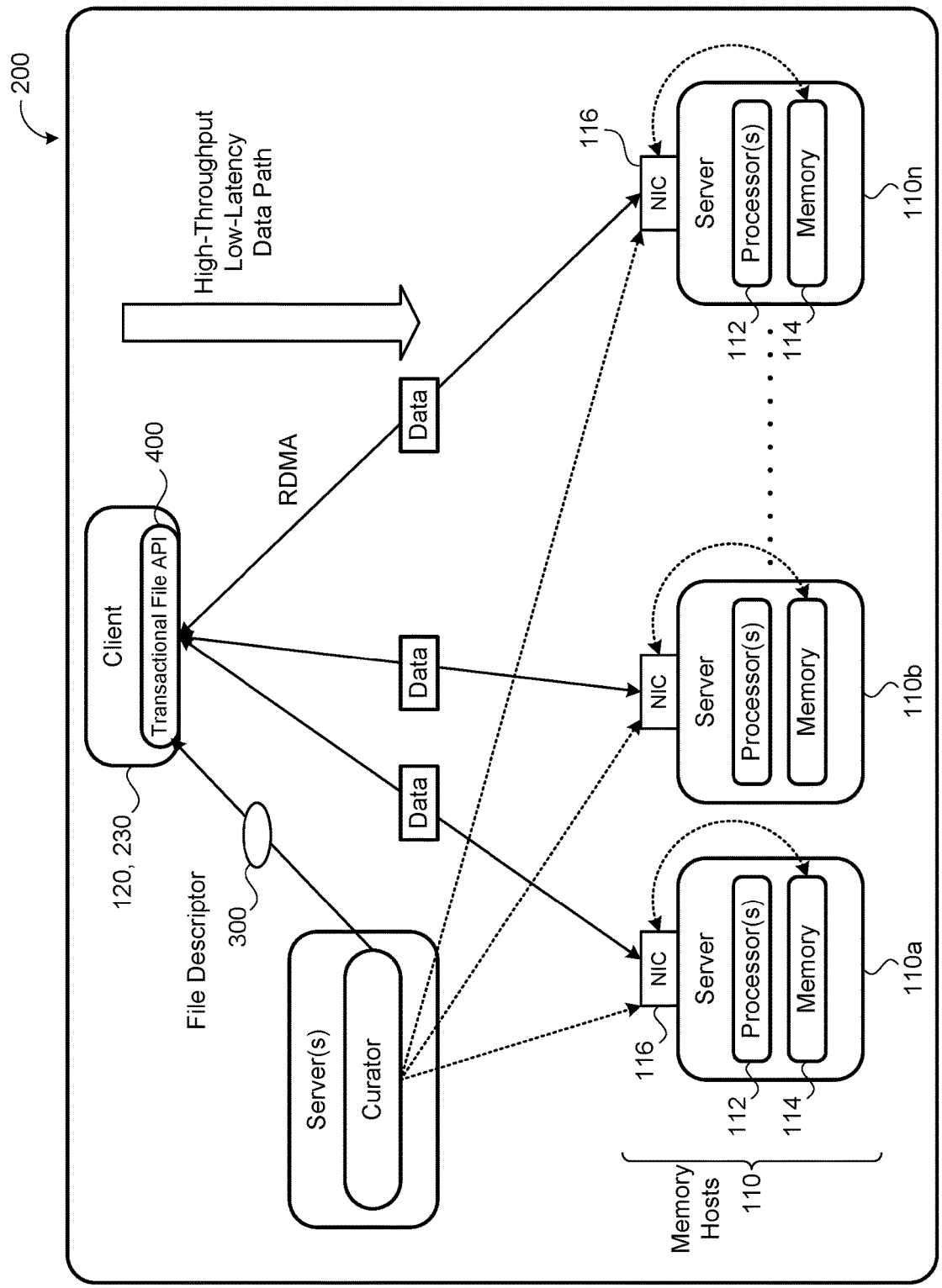
FIG. 2B is a schematic view of an exemplary cell of a distributed storage system.

Referring to FIGS. 2A and 2B, in some implementations, the distributed storage system 100 includes multiple cells 200, each cell 200 including memory hosts 110 and a curator 210 in communication with the memory hosts 110. Each cell 200 may also include one or more stripe doctors 220 (e.g., processes for managing and/or repairing stripes), one or more slowpoke clients 230 (e.g., clients or virtual clients used for assessing system performance), and a console 240 for monitoring and managing the cell 200.

The curator 210 (e.g., process) may execute on a computing processor 202 (e.g., server) connected to the network 130 and manages the data storage (e.g., manages a file system stored on the memory hosts 110), controls data placements, and/or initiates data recovery. Moreover, the curator 210 may track an existence and storage location of data on the memory hosts 110. Redundant curators 210 are possible. In some implementations, the curator(s) 210 track the striping of data across multiple memory hosts 110 and the existence and/or location of multiple copies of a given stripe for redundancy and/or performance. In computer data storage, data striping is the technique of segmenting logically sequential data, such as a file, in a way that accesses of sequential segments are made to different physical storage devices (e.g., cells 200 and/or memory hosts 110). Striping is useful when a processing device requests access to data more quickly than a storage device can provide access. By performing segment accesses on multiple devices, multiple segments can be accessed concurrently. This provides more data access throughput, which avoids causing the processor to idly wait for data accesses.

In some implementations, an application programming interface (API) 400 interfaces between a client 120 and the curator 210. In some examples, the client 120 communicates with the curator 210 through one or more remote procedure calls (RPC). In response to a client request 122, the API 400 may find the storage location of certain data on memory host(s) 110, and obtain a key that allows access to the data. The API 400 communicates directly with the appropriate memory hosts 110 to read or write the data (e.g., using remote direct memory access). In the case that a memory host 110 is non-operational, or the data was moved to a different memory host 110, the client request 122 fails, prompting the client 120 to re-query the curator 210.

Figure 3A:
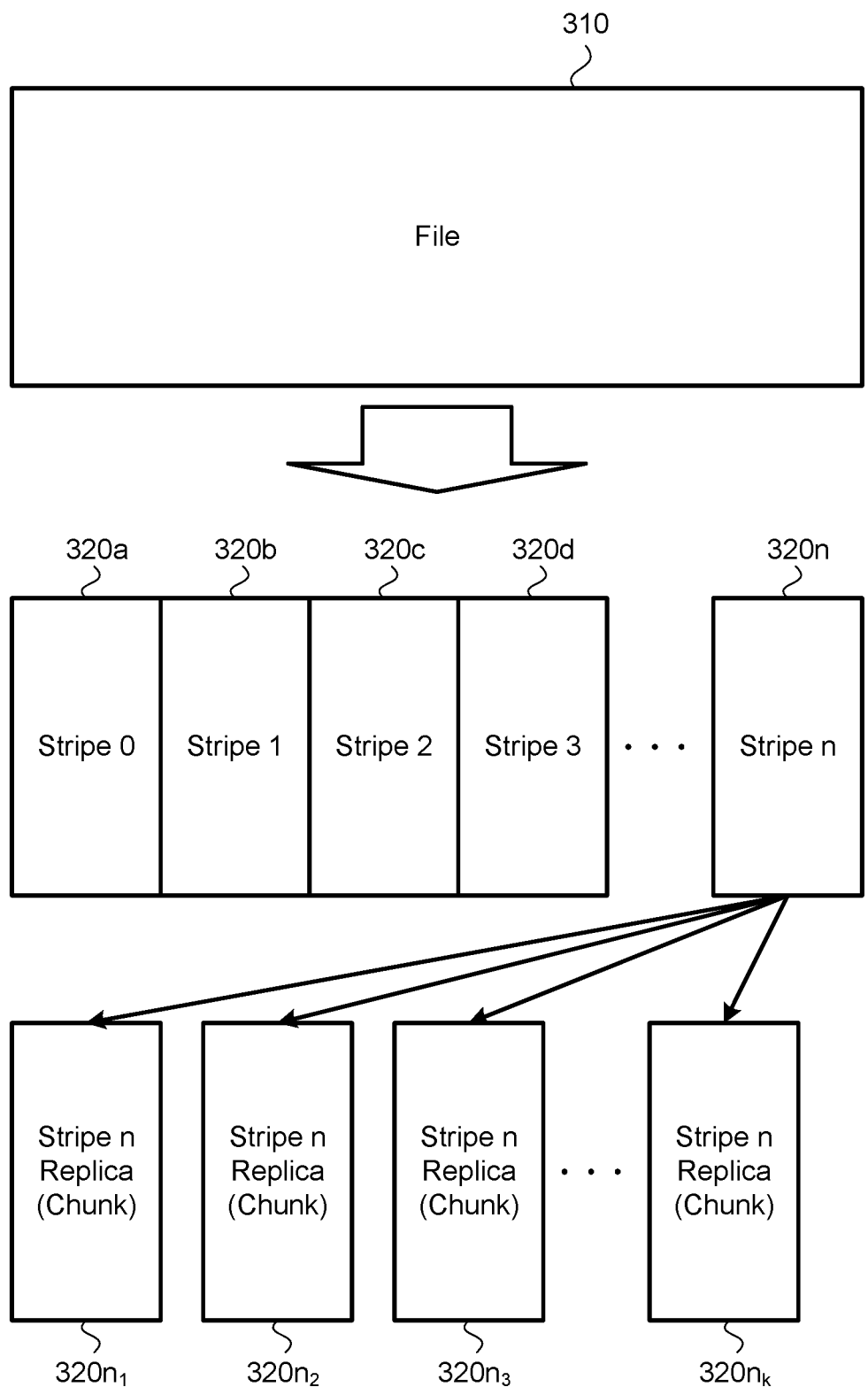
FIG. 3A is a schematic view of an exemplary file split into replicated stripes.
Figure 3B:
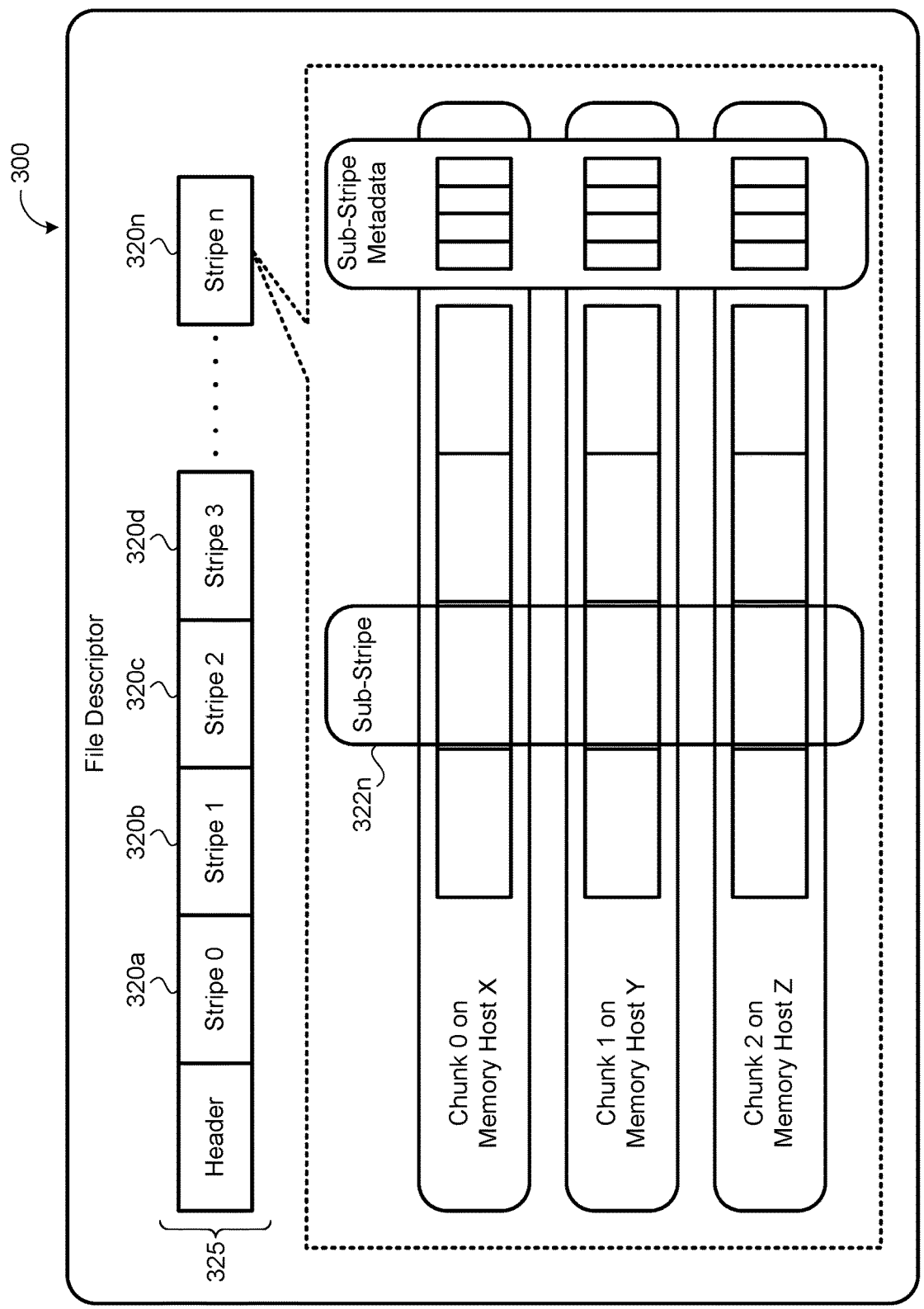
FIG. 3B is a schematic view of an exemplary file descriptor.

Referring to FIGS. 3A and 3B, in some implementations, the memory hosts 110 store file data. The curator 210 may divide each file 310 into stripes 320a-n and replicate the stripes 320a-n in multiple storage locations. A stripe replica $320n_k$ is also referred to as a chunk. Mutable files have additional metadata stored on the memory host(s) 110, such as lock words and version numbers. The lock words and versions numbers may be used to implement a distributed transaction commit protocol.

File descriptors 300 stored by the curator 210 contain metadata that maps the stripes 320a-n to chunks $320n_k$ (i.e., stripe replicas) on the memory hosts 110. To open a file 310, a client 120 sends a request 122 to the curator 210, which returns a file descriptor 300. The client 120 uses the file descriptor 300 to translate file chunk offsets to remote memory locations. After the client 120 loads the file descriptor 300, the client 120 may access the file's data via RDMA or another data retrieval method.

In some implementations, the distributed storage system 100 supports two types of files: immutable and mutable. Immutable files rely on a disk-based file system for persistence and fault-tolerance. A client 120 may copy immutable files into the file system of the distributed storage system 100. On the other hand, a client 120 may write mutable files into the file system of the distributed storage system 100 using the application programming interface (API) 400. The storage system 100 may or may not be durable. The distributed storage system 100 may have strict data loss service level objectives (SLOs) that depend on the files' level of replication. When a stripe 320n is lost, the curator 210 may allocate new storage for the lost stripe 320n and mark the data as uninitialized. A client 120 attempting to read an uninitialized stripe 320n receives an uninitialized data error. At this point, the client 120 can reinitialize the stripe's data.

The file descriptor 300 may provide the state of a file 310. A file can be in one of the following states: READ, READ_WRITE, DELETED, or {CREATE, COPY, RESIZE}_PENDING. In the READ state, clients 120 can read the file 310, but not write to the file 310. Read-only files 310 are read-only for the entire life-time of the file 310, i.e., read-only files 310 are never written to directly. Instead, read-only files 310 can be copied into the file system from another file system. A backing file 310 may be used to restore data when a memory host 110 crashes; consequently, the backing file 310 persists for the entire life-time of the file 310. In the READ_WRITE state, clients 120 with the appropriate permissions can read and write a mutable file's contents. Mutable files 310 support concurrent, fine grain, random writes. Random and sequential write performance may be comparable. Writes are strongly consistent; that is, if any client 120 can observe the effect of a write, then all clients 120 can observe the effect of a write. Writes can also be batched into transactions. For example, a client 120 can issue a batch of asynchronous writes followed by a sync operation. Strong consistency and transactional semantics ensure that if any client 120 can observe any write in a transaction, then all clients 120 can observe all writes in a transaction. In the DELETED state, the file 310 has been deleted. The chunks $320n_k$ belonging to the file 310 are stored in a deleted chunks field and wait for garbage collection. The {CREATE, COPY, RESIZE}_PENDING state denotes a file 310 has a create, copy, or resize operation pending on the file.

An encoding specified by a file encoding protocol buffer of the file descriptor 300 may be used for all the stripes 320a-n within a file 310. In some examples, the file encoding contains the following fields: "data chunks," which provides a number of data chunks $320n_k$ per stripe 320n; "stripe length," which provides a number of bytes per stripe 320n; and "sub-stripe length," which provides a number of bytes per sub-stripe. The sub-stripe length may be only valid for READ_WRITE files. The data for a file 310 may be described by an array of stripe protocol buffers 325 in the file descriptor 300. Each stripe 320n represents a fixed region of the file's data, identified by an index within the array. The contents of a stripe 320n may include an array of chunk protocol buffers, each describing a chunk $320n_k$ within the stripe 320n, including a chunk handle, an identity of the memory host 110 holding the chunk $320n_k$, and a current state of the chunk $320n_k$. For RDMA purposes, the chunk protocol buffers may also store a virtual address of the chunk $320n_k$ in the memory host 110 and a 32-bit r-key. The r-key is unique to a chunk $320n_k$ on a memory host 110 and is used to RDMA-read that chunk $320n_k$.

Chunks $320n_k$ can be in one of the following states: OK, Recovering, Migrating Source, and Migrating Destination. In the OK state, the contents are valid and the chunk $320n_k$ contributes to the replication state of the corresponding stripe 320n. Clients 120 may update all chunks $320n_k$ in a good state. In the Recovering state, the chunk Recovering is in the process of being recovered. The chunk Recovering does not count towards the replicated state of the corresponding stripe 320n and the data in the chunk $320n_k$ is not necessarily valid. Therefore, clients 120 cannot read data from chunks $320n_k$ in the Recovering state. However, all transactions not reaching their commit point at the time a chunk state changes to the Recovering state must include the Recovering chunk in the transaction in order to ensure that the chunk's data is kept up to date during recovery. In the Migrating Source state, the chunk $320n_k$ is in the process of migrating. A migrating source attribute may provide a location from which the chunk $320n_k$ is migrating. The source chunk $320n_k$ counts towards the replication of the stripe $320n$ and the data in the chunk $320n_k$ is valid and can be read. In the Migrating Destination state, the chunk is in the process of migrating. A Migrating Destination attribute provides the location to which the chunk $320n_k$ is migrating. The source chunk $320n_k$ does not count towards the replicated state of the stripe $320n$ and the chunk $320n_k$ is not necessarily valid. Therefore, clients 120 cannot read from chunks $320n_k$ in the Migrating Destination state. However, all transactions not reaching their commit point at the time a chunk's state changes to the Migrating Destination state must include the Migrating Destination chunk $320n_k$ in the transaction in order to ensure the chunk's data is kept up to date as it is being migrated.

Each file descriptor 300 may have a dead chunks array. The dead chunks array holds additional chunks $320n_k$ that are no longer needed, such as the chunks $320n_k$ that made up a file 310 that has since been deleted, or made up previous instances of the file 310. When the file 310 is deleted or truncated, the chunks $320n_k$ from all the stripes $320n$ are moved into this dead chunks array and the stripes $320n$ are cleared. The chunks $320n_k$ in the dead chunks array are reclaimed in the background.

The application programming interface 400 may facilitate transactions having atomicity, consistency, isolation, durability (to a degree), such that the transaction may be serializable with respect to other transactions. ACID (atomicity, consistency, isolation, durability) is a set of properties that guarantee that database transactions are processed reliably. In the context of databases, a single logical operation on the data is called a transaction. Atomicity requires that each transaction is "all or nothing": if one part of the transaction fails, the entire transaction fails, and the database state is left unchanged. An atomic system guarantees atomicity in each and every situation, including power failures, errors, and crashes. Consistency ensures that any transaction brings the database from one valid state to another. Any data written to the database must be valid according to all defined rules, including but not limited to constraints, cascades, triggers, and any combination thereof. Isolation ensures that no transaction should be able to interfere with another transaction. One way of achieving this is to ensure that no transactions that affect the same rows can run concurrently, since their sequence, and hence the outcome, might be unpredictable. This property of ACID may be partly relaxed due to the huge speed decrease this type of concurrency management entails. Durability means that once a transaction has been committed, it will remain so, even in the event of power loss, crashes, or errors. In a relational database, for instance, once a group of SQL statements execute, the results need to be stored permanently. If the database crashes immediately thereafter, it should be possible to restore the database to the state after the last transaction committed.

Figure 4:
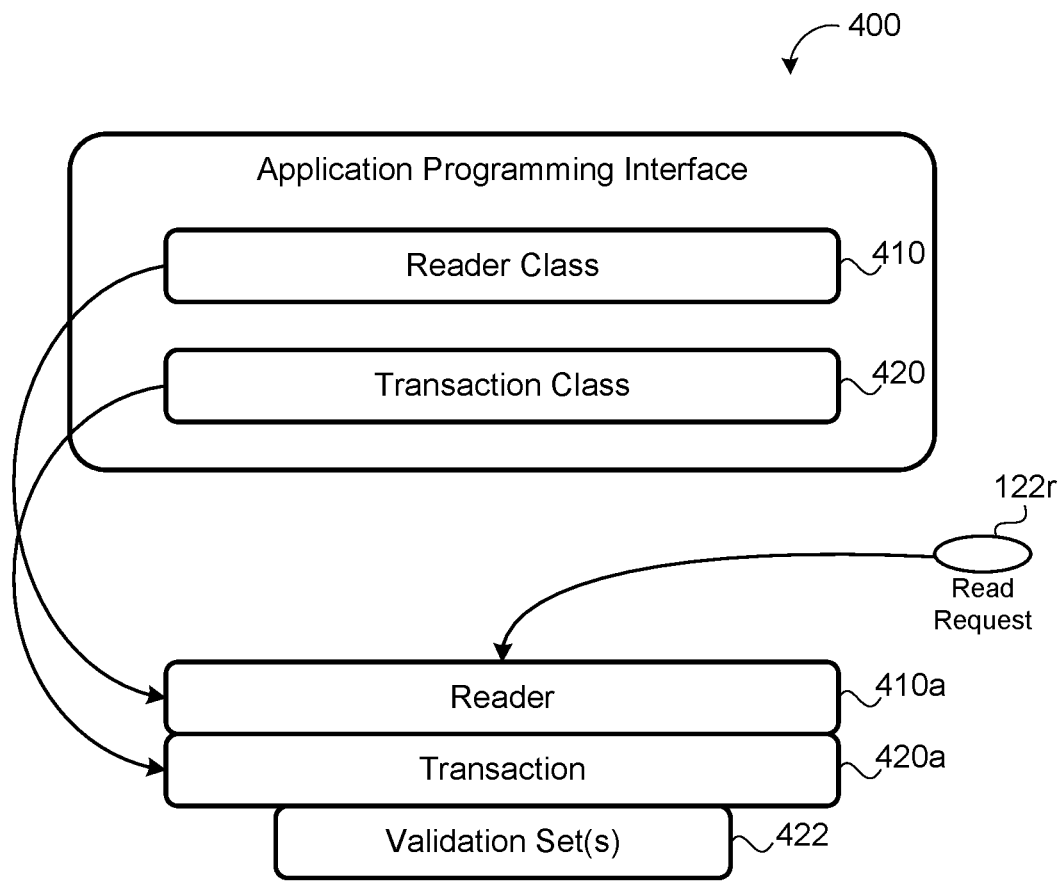
FIG. 4 is a schematic view of an exemplary application programming interface.

Referring to FIG. 4, in some implementations, the application programming interface (API) 400 includes a reader class 410 and a transaction class 420. A client 120 may instantiate a reader 410a inheriting the reader class 410 to execute a read or batches of reads on the memory hosts 110 in a cell 200. Moreover, the client 120 may instantiate a transaction 420a inheriting the transaction class 420 to execute one or more reads and/or writes. The reads and writes in a transaction 420a may be to different files 310 in a cell 200, but in some implementations, all reads and writes in a transaction must be to files 310 in the same cell 200. Reads may be executed and are "snapshot consistent," meaning that all reads in a transaction 420a can see a snapshot of the file 310 at a logical instant in time. Writes can be buffered until the client 120 tries to commit the transaction 420a.

When a client 120 adds a file read request 122r to the reader 410a, the reader 410a translates the read request 122r into a RDMA read network operation and stores a state of the network operation in memory allocated for the reader 410a. Reads that cross chunk boundaries get translated into multiple RDMA operations.

In some implementations, to translate a file read request 122r into a RDMA read network operation, the reader 410a computes a target stripe number from a file offset of the read request 122r. The reader 410a may use the stripe number to index into a chunk handle cache. The chunk handle cache returns a network channel to access the corresponding chunk $320n_k$ and a virtual address and r-key of the chunk $320n_k$. The reader 410a stores the network channel and r-key directly in an operation state of the RDMA read. The reader 410a uses the virtual address of the chunk $320n_k$ and the file offset to compute the virtual address within the chunk $320n_k$ to read. The reader 410a computes the offset into a memory block supplied by the client 120 (e.g., a receiving memory block for each RDMA read operation). The reader 410a may then initialize an operation status.

While buffering new reads, the reader 410 may calculate and store a running sum of the amount of metadata that will be retrieved to complete the read. This allows metadata buffer space to be allocated in one contiguous block during execution, minimizing allocation overhead.

In some implementations, the reader 410a executes a read operation in two phases. In the first phase, the reader 410a reads the data and associated metadata of a file 310. In the second phase, the reader 410a validates that the data read in the first phase satisfies data consistency constraints of the reader 410a. In the first phase, the reader 410a transmits its RDMA read operations. While iterating through and transmitting RDMA reads, the reader 410a initializes and transmits RDMA reads to read sub-chunk metadata and to read data needed to compute checksums of the first and last sub-chunks in an unaligned file access. After the data and metadata are received, the reader 410a may check lock-words in the sub-chunk metadata to ensure that the sub-chunks were not locked while the data was being read. If a sub-chunk was locked, the reader 410a rereads the sub-chunk and its corresponding metadata. Once the reader 410a finds (reads) all of the sub-chunk locks in an unlocked state, the reader 410a computes the sub-chunk checksums and compares the computed checksums with the checksums read from the sub-chunk metadata.

A sub-chunk checksum may fail a compare for one of three reasons: 1) the data read was corrupted by a concurrent write; 2) the data was corrupted while in transit to the client; or 3) the data stored in the memory host is corrupt. Cases 1 and 2 are transient errors. Transient errors are resolved by retrying the sub-chunk read. Case 3 is a permanent error that may require the client to notify the curator of a corrupt sub-stripe 322n.

To differentiate between a transient error and a permanent error, the client 120 may re-read the sub-chunk data and metadata. The reader 410a then checks the sub-chunk lock-word and re-computes and compares the sub-chunk checksum. If the checksum error still exists and the sub-chunk version number has changed since the sub-chunk was initially read, then the checksum compare failure was likely caused by a concurrent write so the reader 410a retries the sub-chunk read. If the version number has not changed since the sub-chunk was initially read, then the error is permanent and the reader 410a notifies the curator 210, and the curator 210 tries to reconstruct the data of the chunk $320n_k$. If the curator 210 is unable to reconstruct the chunk data, the curator 210 replaces the old chunk $320n_k$ with a new uninitialized chunk $320n_k$.

Sub-chunk locks may become stuck due to a client 120 trying to execute a transaction 420a but crashing during a commit protocol of the transaction 420a. A reader 410a can detect a stuck lock by re-reading the sub-chunk lock-word and version number. If a sub-chunk lock-word and version number do not change during some time out period, then the sub-chunk lock is likely stuck. When the reader 410a detects a stuck lock, it notifies the curator 210 of the stuck lock and the curator 210 recovers the sub-stripe 322n and resets the stuck lock.

After the reader 410a validates each sub-chunk lock-word and checksum, the reader 410a may proceed to the second phase of executing the read operation (i.e., the validation phase). To validate the values, the reader 410a rereads sub-chunk metadata and rechecks if the sub-chunk lock-words are unlocked and the sub-chunk version numbers have not changed since the version numbers were initially read during the first phase of the read operation. If the reader 410a is associated with a transaction 420a, the reader 410a may reread the metadata associated with all sub-chunks read by the transaction 420a. If a single sub-chunk version number mis-compares, the reader 410a returns an error. If all sub-chunk version numbers are the same, the reader 410a discards the prefix and suffix of the reader memory block in order to trim extraneous data read to compute the checksum of the first and last sub-chunks in the read. The reader 410a may set a status to OK and returns to the client 120.

If the reader 410a encounters an error on a network channel while reading data or metadata of a chunk, the reader 410a may select a different chunk $320n_k$ from the chunk handle cache and notifies the curator 210 of a bad memory host. If no other good chunks $320n_k$ exist from which the reader 410a can read, the reader 410a may wait to receive a response to the error notification it sent to the curator 210. The response from the curator 210 may contain an updated file descriptor 300 that contains a new good chunk $320n_k$ to read from.

In some implementations, the transaction class 420 uses validation sets 422 to track which sub-stripes 322n have been read by the transaction 420a. Each read of a transaction 420a adds the version numbers of all sub-stripes 322n read to a validation set 422 of the transaction 420a. The transaction 420a may validate the validation set 422 in two cases: 1) as part of the commit protocol and 2) the validation phase of reads of a transaction 420a. A transaction 420a may fail to commit if the commit protocol finds that any sub-stripe version number differs from the number recorded in the validation set 422. Validation of the full validation set 422 before data is returned to the client 120 allows early detection (e.g., before the commit phase) of a doomed transaction 420a. This validation also prevents the client 120 from getting an inconsistent view of file data.

A transaction 420a may provide a synchronous, serializable read operation (e.g., using a reader). In some examples, a reader 410a is instantiated and associated with the transaction 420a. Read results of the reader 410a return the latest committed data. As such, uncommitted writes of the same transaction 420a are not seen by a read of that transaction 420a.

A transaction 420a may buffer data for a later transaction commit. The transaction class 420 translates a buffer write request into one or more 'prepare write' network operations. One network operation is needed for each stripe 320n touched by the write operation. Processing a buffer write request may involve preparing 'sub-stripe lock' network operations. One lock operation is needed for each sub-stripe 322n touched by the requested write. These operations are buffered for transmission during the transaction commit. The transaction 420a may translate buffer write requests into network operations and execute identify or coalesce writes that affect the same region of a file 310. The transaction 420a may apply write operations in the same order by the memory hosts 110 for all chunks $320n_k$ to ensure that all replicas are consistent.

The transaction 420a may provide a commit operation that results in all reads and writes in the transaction 420a being schedulable as a single atomic, serializable operation. In some implementations, the transaction commit protocol proceeds through a lock phase, a validate phase, a write phase, and an unlock phase. During the lock phase, the sub-stripe lock network operations which were created in response to buffer write requests are sent. Each sub-stripe lock operation executes an atomic compare-and-swap operation on the lock-word in all replicas $320n_k$. If the client 120 succeeds in writing its unique client ID into the metadata lock-word, it has successfully taken the lock. If the transaction 420a fails to take the lock for any sub-stripe 322n in the write set, the commit fails and is aborted. The commit protocol proceeds to the validate phase once all sub-stripe locks are held.

During the validate phase, the transaction 420a may read the version number out of the metadata for all sub-stripes 322n referenced in the validation set and comparing the version numbers to the version numbers recorded in the validation set. If a version number does not match, the sub-stripe 322n was written by another transaction after it was read by this transaction, so the transaction must fail. In this case, the reader 410a releases the locks it holds and returns a transaction conflict error to the client 120. Once all version numbers in the validation set have been validated, the client 120 writes the buffered write data of the transaction 420a to each replica $320n_k$ and updates the metadata associated with each sub-stripe 322n written by the transaction 420a, during the write phase. Updating metadata of a sub-stripe 322n may include computing and writing a new check-word and incrementing the version number of the sub-stripe 322n. Once all data and metadata has been updated, the transaction 420a releases the locks that it holds, during the unlock phase.

Figure 5:
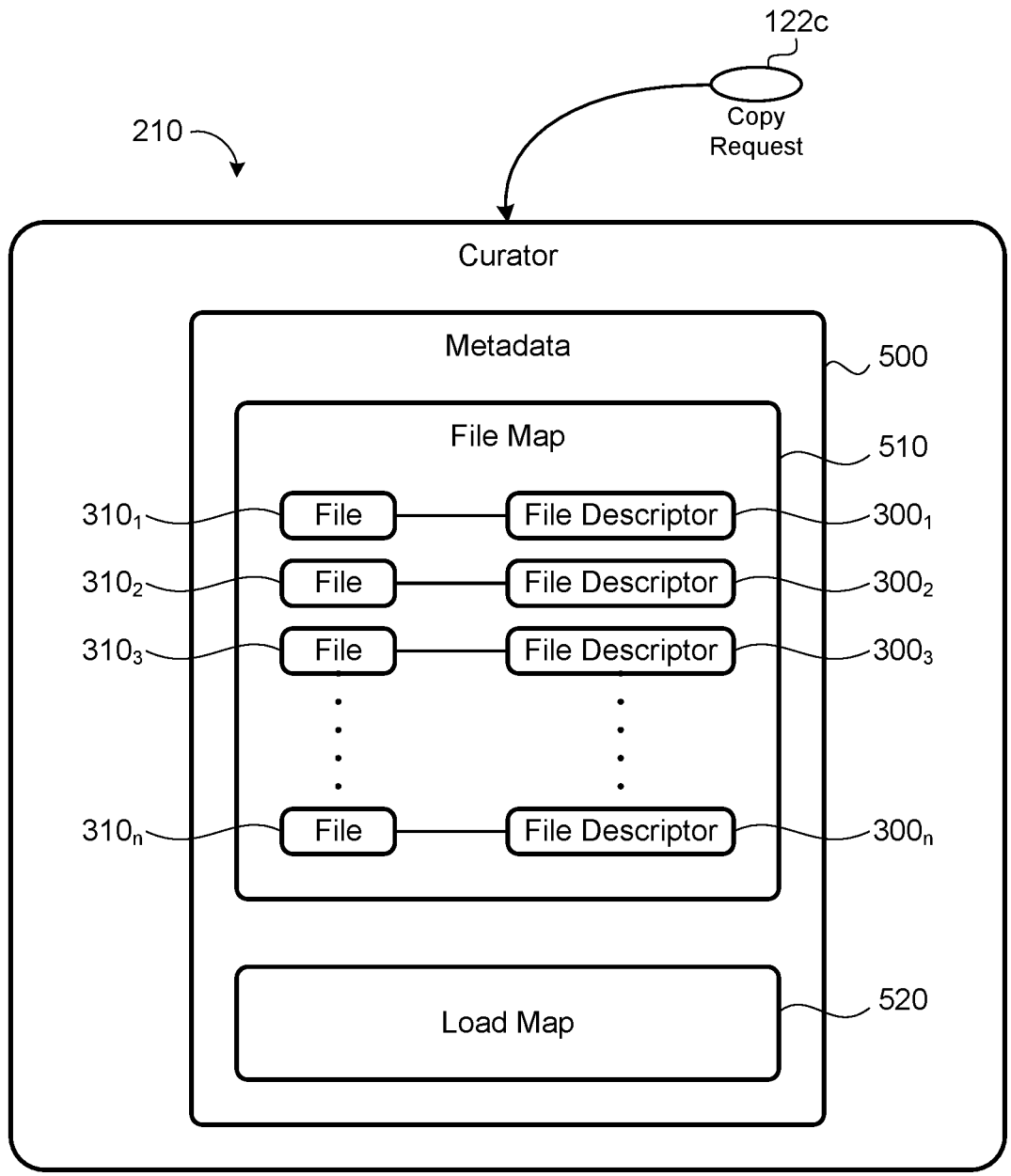
FIG. 5 is a schematic view of an exemplary curator.

Referring to FIG. 5, in some implementations, the curator 210 stores and manages file system metadata 500. The metadata 500 includes a file map 510 that maps files 3101-n to file descriptors $300_{1-n}$. The curator 210 may examine and modify the representation of its persistent metadata 500. The curator 210 may use three different access patterns for the metadata 500: read-only, file transactions, and stripe transactions. Read-only access allows the curator 210 to examine a state of the metadata 500 with minimal contention. A read-only request returns the most recent state of a file 310, but with no synchronization with concurrent updates. The read-only access may be used to respond to lookup requests from clients 120 (e.g., for internal operations, such as file scanning).

File transaction access may provide exclusive read/write access to the state of a file descriptor 300. Updates to the file state may be applied at the end of a transaction 420a and are atomic. File transaction access can be used for operations such as creating, finalizing, and deleting a file 310. These operations may require the curator 210 to communicate with other components such as memory hosts and thus a file transaction access may last for several seconds or more. While active, the file transaction access blocks any other operations that need to modify the state of the file descriptor 300. Read access may not be blocked.

To reduce contention, stripe transaction access may provide relatively finer grain synchronization for operations that only need to modify the state of a single stripe $320n$ with the file descriptor 300. This mode can be used for stripe operations such as opening, closing, rebalancing, and recovering. There can be many concurrent stripe transactions for different stripes $320n$ within a file 310, but stripe transactions and file transactions are mutually exclusive. Within a stripe transaction, the curator 210 may examine the state of a stripe $320n$ and various fields of the file descriptor 300 that remain immutable for the duration of the transaction 420a, such as the file encoding and instance identifier. The stripe transaction access does not provide access to fields that can change underfoot, such as the state of other stripes $320n$. Operations may hold only one active transaction 420a at a time to avoid deadlock. Moreover, transactions 420a may only atomically commit on a single file 310.

In some implementations, the curator 210 can create, copy, resize, and delete files. Other operations are possible as well. To service a copy request 122c from a client 120, the curator 210 creates a new file descriptor 300 having a state initially set to COPY PENDING. The curator 210 may set/initialize one or more of the following fields: size, owner, group, permissions, and/or backing file. The curator 210 populates a stripes array 325 of the file descriptor 300 (FIG. 3B) with empty stripes $320n$ and then commits the file descriptor 300 to its file map 510. Committing this information to the file map 510 allows the curator 210 to restart a resize operation if the curator 210 crashes or a tablet containing the file system metadata 500 migrates to another curator 210. Once the curator 210 commits file descriptor 300 to the file map 510, the curator 210 responds to the client copy request 122c by informing the client 120 that the copy operation has been initiated. The curator 210 initiates memory-host-pull-chunk operations, which instruct memory hosts 110 to allocate a new chunk $320n_k$ and to read chunks $320n_k$ of the backing file into the memory 114 of the memory hosts 110. When a pull-chunk operation returns successfully, the curator 210 adds the new chunk $320n_k$ to the appropriate stripe $320n$ in the file descriptor 300. The curator 210 commits the stripe $320n$ with the new chunk $320n_k$ to the file map 510.

In the case of a crash or a migration, incrementally updating the file descriptors 300 allows a new curator 210 to restart a copy operation from the location the prior curator 210 stopped. This also allows clients 120 to check the status of a copy operation by retrieving the file descriptor 300 (e.g., via a lookup method) and inspecting the number of stripes $320n$ in the file descriptor 300 populated with chunks $320n_k$. Once all chunks $320n_k$ have been copied to the memory hosts 110, the curator 210 transitions the state of the file descriptor 300 to READ and commits it to the file map 510.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying slowpoke clients 230 to gather latency statistics from a client's point of view. In some examples, the curator 210 uses the memory host status information to make rebalancing, draining, recovery decisions, and allocation decisions.

The curator(s) 210 may allocate chunks in order to handle client requests 122 for more storage space in a file 310 and for rebalancing and recovery. The curator 210 may maintain a load map 520 of memory host load and liveliness. In some implementations, the curator 210 allocates a chunk $320n_k$ by generating a list of candidate memory hosts 110 and sends an allocate chunk requests to each of the candidate memory hosts 110. If the memory host 110 is overloaded or has no available space, the memory host 110 can deny the request. In this case, the curator 210 selects a different memory host 110. Each curator 210 may continuously scan its designated portion of the file namespace, examining all the metadata 500 every minute or so. The curator 210 may use the file scan to check the integrity of the metadata 500, determine work that needs to be performed, and/or to generate statistics. The file scan may operate concurrently with other operations of the curator 210. The scan itself may not modify the metadata 500, but schedules work to be done by other components of the system and computes statistics.

For each file descriptor 300, the file scan may: ensure that the file descriptor 300 is well formed (e.g., where any problems may indicate a bug in either the curator or in the underlying storage of the metadata); update various statistics, such as the number of files 310, stripes $320n$, chunks $320n_k$, and the amount of storage used; look for stripes $320n$ that need recovery; determine if the file descriptor 300 contains chunks $320n_k$ that are candidates for rebalancing from overfull memory hosts 110; determine if there are chunks $320n_k$ on draining memory hosts 110; determine if there are chunks $320n_k$ that are candidates for rebalancing to under-full memory hosts 110; determine chunks $320n_k$ that can be deleted; and/or determine if the file descriptor 300 has a pending resize or copy operation, but there is no active task within the curator 210 working on the operation.

Referring again to FIGS. 2A and 2B, the distributed storage system 100 may include one or more stripe doctors 220 in each cell 200 that fix and recover stripe data. For example, each cell 200 may have several stripe doctors 220 that execute rebalancing and recovery operations. Additionally or alternatively, the distributed storage system 100 may include one or more slowpoke clients 230 that monitor a cell's performance from a client's prospective. A slowpoke client 230 provides latency information to the curator(s) for chunk allocation and rebalancing. For example, each slowpoke client 230 collects latency statistics for every memory host 110 in a cell. A cell 200 may have several slowpoke clients 230 to improve network path coverage and fault tolerance. Since it is unlikely that the curator may completely lose the latest latency statistics for a memory host 110 in the cell 200, curators 210 can make chunk allocation and rebalancing decisions without the slowpoke latency information.

Figure 6:
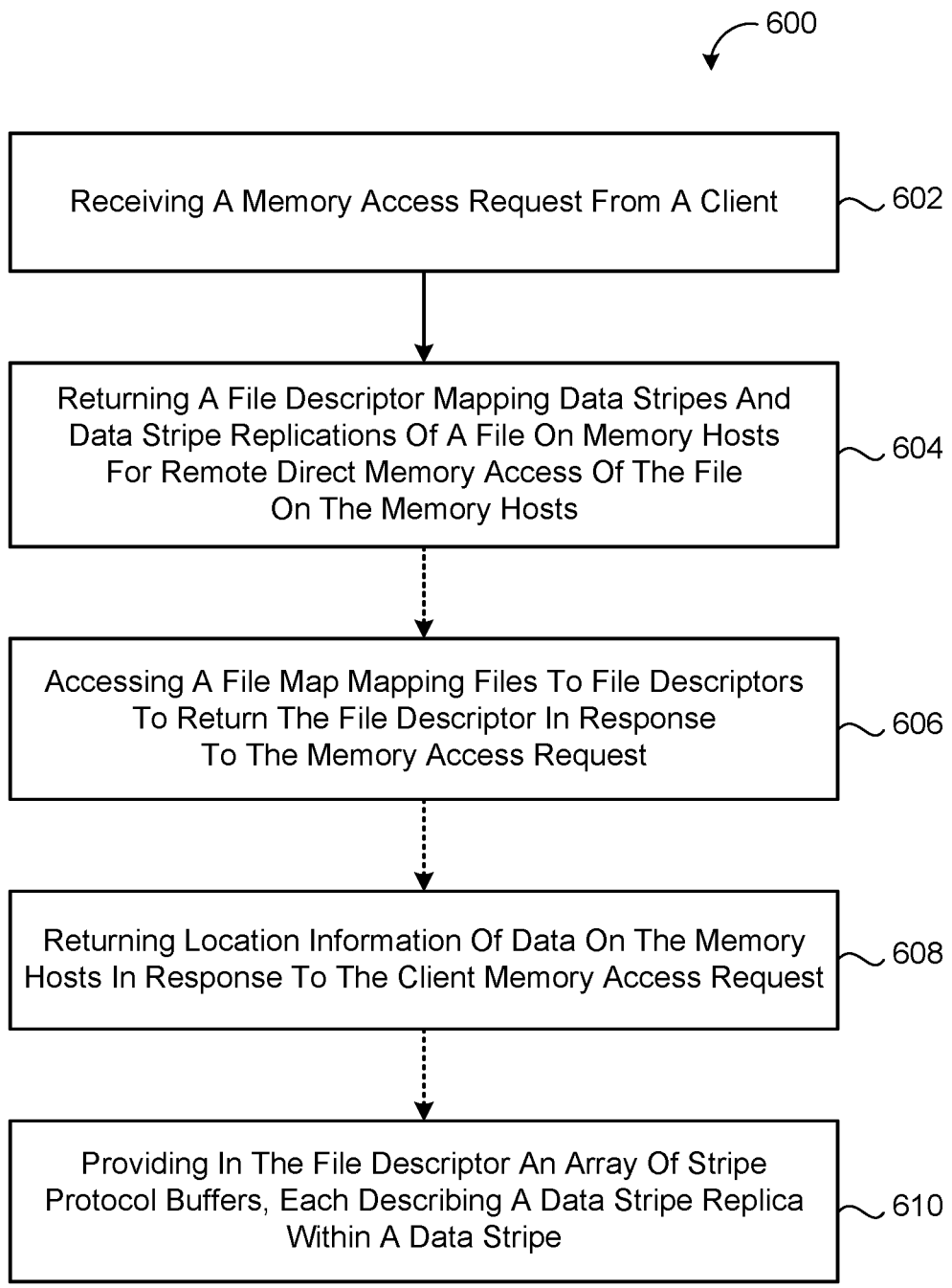
FIG. 6 provides an exemplary arrangement of operations for a method of providing access to data stored on a distributed storage system.

FIG. 6 provides an exemplary arrangement 600 of operations for a method of providing access to data stored on a distributed storage system. The method includes electronically receiving 602 a memory access request 122 from a client 120 and returning a file descriptor 300 mapping data stripes $320n$ and data stripe replications $320n_k$ of a file 310 on memory hosts 110 for remote direct memory access (RDMA) of the file 310 on the memory hosts 110.

In some implementations, the method includes accessing 606 a file map 510 mapping files 310 to file descriptors 300 to return the file descriptor 300 in response to the memory access request 122. The method may include returning 608 location information of data on the memory hosts 110 in response to the client memory access request 122. The method may include returning a key to allow access to data on the memory hosts 110 in response to the client memory access request 122. In some examples, the method includes allocating storage of a data stripe 320$n$ on the memory hosts 110. The method may include dividing the file 310 into data stripes 320$n$ and replicating each data stripe 320$n$ into multiple storage locations of the memory hosts 110.

In some implementations, the method includes providing at least one of a file state attribute providing a state of a file, a data chunks attribute providing a number of stripe replicas 320$n_k$ per stripe 320$n$, a stripe length attribute providing a number of bytes per stripe 320$n$, and a sub-stripe length attribute providing a number of bytes per sub-stripe 322$n$ in the file descriptor 300. The method may include providing 610 in the file descriptor 300 an array of stripe protocol buffers 325, each describing a data stripe replica 320$n_k$ within a data stripe 320$n$.

Servicing storage requests 122 in hardware provides a number of advantages, such as having relatively simple storage requests (e.g., read, write). Implementing such functionality in an application specific integrated circuit (ASIC) can be much more efficient than implementing the functionality in software running on a general-purpose processor. This efficiency improvement means storage requests 122 can be serviced in less time and occupy fewer circuits when compared to implementing the same functionality in software running on a general-purpose processor. In turn, this improvement means a distributed storage system 100 can achieve lower latency and higher throughput without increasing the cost of the system.

Servicing storage requests 122 in the network interface hardware (e.g., NIC) decouples processor resources 112 and storage resources 114. A client 120 can access storage resources 114 on a memory host 110 without available processor resources 112. This allows system builders and administrators to operate a distributed storage system 100 with high processor utilization, with low and predictable latencies, and without stranding storage resources. In some implementations, the distributed storage system 100 can provide an average read latency of less than 10 microseconds, an average read throughput of greater than 2 million operations per second per client, and average write latency of less than 50 microseconds, and/or an average write throughput of greater than 500 thousand operations per second per client.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method when executed by data processing hardware of a distributed storage system causes the data processing hardware to perform operations comprising:
   dividing a file into a plurality of data stripes;
   for each respective data stripe of the plurality of data stripes, allocating storage of the respective data stripe to a respective memory host of a plurality of memory hosts of the distributed storage system;
   receiving, from a client, a memory access request requesting access to the file;
   in response to the memory access request, retrieving a file descriptor mapping each respective data stripe to the respective memory host of the plurality of memory hosts for access of the file by the client;
   receiving an external notification indicating that an attempt to access a particular data stripe of the plurality of data stripes stored at a particular memory host of the plurality of memory hosts has failed; and
   in response to receiving the external notification, reconstructing the particular data stripe.

2. The computer-implemented method of claim 1, wherein the operations further comprise, in response to the memory access request, returning a key allowing access to data on the plurality of memory hosts.

3. The computer-implemented method of claim 1, wherein the file descriptor comprises an array of stripe protocol buffers, each stripe protocol buffer describing a particular replica data stripe within a particular respective data stripe.

4. The computer-implemented method of claim 1, wherein the operations further comprise determining a state of each respective data stripe of the plurality of data stripes, the state indicating whether the respective data stripes is available for allocation to a respective destination storage location.

5. The computer-implemented method of claim 1, wherein the operations further comprise receiving an indication that the client was able to access the file.

6. The computer-implemented method of claim 1, wherein the memory access request comprises a RDMA read network operation.

7. The computer-implemented method of claim 1, wherein the operations further comprise:
receiving, from the client, a second memory access request;
in response to the second memory access request, determining that at least one of the plurality of data stripes is migrating to a respective destination storage location of the plurality of memory hosts; and
denying the second memory access request.

8. The computer-implemented method of claim 1, wherein each respective memory host of the plurality of memory hosts comprises a network interface controller in communication with a memory of the respective memory host, the network interface controller servicing remote direct memory access requests.

9. The computer-implemented method of claim 1, wherein the file descriptor comprises one or more of:
a file state attribute indicating a state of the file;
a data chunks attribute indicating a number of replica data stripes per respective data stripe;
a stripe length attribute indicating a number of bytes per respective data stripe; or
a sub-stripe length attribute indicating a number of bytes per sub-stripe in the file descriptor.

10. The computer-implemented method of claim 1, wherein the operations further comprise:
accessing a file map mapping files to a plurality of file descriptors; and
in response to the memory access request, returning the file descriptor from the plurality of file descriptors.

11. A system comprising:
data processing hardware of a distributed storage system; and
memory hardware in communication with the data processing hardware, the memory hardware storing instructions that when executed on the data processing hardware cause the data processing hardware to perform operations comprising:
dividing a file into a plurality of data stripes;
for each respective data stripe of the plurality of data stripes, allocating storage of the respective data stripe to a respective memory host of a plurality of memory hosts of the distributed storage system;
receiving, from a client, a memory access request requesting access to the file;
in response to the memory access request, retrieving a file descriptor mapping each respective data stripe to the respective memory host of the plurality of memory hosts for access of the file by the client;
receiving an external notification indicating that an attempt to access a particular data stripe of the plurality of data stripes stored at a particular memory host of the plurality of memory hosts has failed; and
in response to receiving the external notification, reconstructing the particular data stripe.

12. The system of claim 11, wherein the operations further comprise, in response to the memory access request, returning a key allowing access to data on the plurality of memory hosts.

13. The system of claim 11, wherein the file descriptor comprises an array of stripe protocol buffers, each stripe protocol buffer describing a particular replica data stripe within a particular respective data stripe.

14. The system of claim 11, wherein the operations further comprise determining a state of each respective data stripe of the plurality of data stripes, the state indicating whether the respective data stripes is available for allocation to a respective destination storage location.

15. The system of claim 11, wherein the operations further comprise receiving an indication that the client was able to access the file.

16. The system of claim 11, wherein the memory access request comprises a RDMA read network operation.

17. The system of claim 11, wherein the operations further comprise:
receiving, from the client, a second memory access request;
in response to the second memory access request, determining that at least one of the plurality data stripes is migrating to a respective destination storage location of the plurality of memory hosts; and
denying the second memory access request.

18. The system of claim 11, wherein each respective memory host of the plurality of memory hosts comprises a network interface controller in communication with a memory of the respective memory host, the network interface controller servicing remote direct memory access requests.

19. The system of claim 11, wherein the file descriptor comprises one or more of:
a file state attribute indicating a state of the file;
a data chunks attribute indicating a number of replica data stripes per respective data stripe;
a stripe length attribute indicating a number of bytes per respective data stripe; or
a sub-stripe length attribute indicating a number of bytes per sub-stripe in the file descriptor.

20. The system of claim 11, wherein the operations further comprise:
accessing a file map mapping files to a plurality of file descriptors; and
in response to the memory access request, returning the file descriptor from the plurality of file descriptors.

* * * * *